United States Patent
Havens et al.

[11] Patent Number: 5,392,603
[45] Date of Patent: Feb. 28, 1995

[54] BEVEL GEAR LOAD BALANCE IN A HYDROSTATIC TRANSMISSION

[75] Inventors: Dale I. Havens, Addison; Roland L. von Kaler, Tecumseh, both of Mich.

[73] Assignee: Tecumseh Products Company, Tecumseh, Mich.

[21] Appl. No.: 22,664

[22] Filed: Mar. 1, 1993

[51] Int. Cl.$^6$ ............... F16D 31/00; F16D 39/00
[52] U.S. Cl. ....................... 60/327; 60/487; 91/491
[58] Field of Search ............ 60/487, 488, 485, 327; 92/12.1, 58, 72; 91/491, 493, 494, 496; 417/269

[56] References Cited

U.S. PATENT DOCUMENTS

| | | | |
|---|---|---|---|
| 2,237,018 | 4/1941 | Tweedale | 60/487 |
| 2,599,609 | 6/1952 | Carey | 92/58 |
| 4,244,279 | 1/1981 | Stewart et al. | 60/487 X |
| 4,730,546 | 3/1988 | Eickmann | 92/58 X |
| 5,042,252 | 8/1991 | Havens et al. | 60/487 |
| 5,078,659 | 1/1992 | von Kaler | 475/78 |
| 5,239,827 | 8/1993 | Havens | 60/487 |

FOREIGN PATENT DOCUMENTS 1911230  9/1970  Germany ................ 92/58

*Primary Examiner*—Edward K. Look
*Assistant Examiner*—Hoang Nguyen
*Attorney, Agent, or Firm*—Baker & Daniels

[57] ABSTRACT

An apparatus for balancing and supporting various loads exerted on the pump cylinder block and associated bevel gear in a radial piston type hydraulic transmission for assuring concentric rotation about the pintle during operation. A hydraulic pressure pad, acting as a hydraulic piston, is located on the outer surface of the pintle at least partially underneath the pump cylinder block hub portion for counteracting the loads exerted against the pump cylinder block and associated bevel gear. A groove circumferentially disposed in the outer surface of the pintle supplies oil to the pressure pad from a bore disposed in the groove and in communication with the high pressure passage of the pintle. The pressure pad is preferably disposed 90° from the input shaft and associated input bevel gear. Additional grooving on the outside circumferential surface of the pintle provides lubrication between the rotating cylinder blocks of the pump and motor, and the pintle.

18 Claims, 3 Drawing Sheets

BEVEL GEAR LOAD BALANCE IN A HYDROSTATIC TRANSMISSION

BACKGROUND OF THE INVENTION

1. Field of the Invention

The present invention relates to variable displacement hydrostatic transmissions and, more specifically, to hydrostatic transmissions utilizing pumps and motors of the radial piston type.

2. Description of the Related Art

Generally, hydrostatic transmissions consist of a variable displacement hydraulic pump unit driven by an internal combustion engine of the vehicle, and a fixed displacement hydraulic motor unit connected to the drive train of the vehicle. A closed fluid loop consisting of first and second conduits fluidly connect the pump with the motor. By increasing the fluid displacement of the pump, the pump drives the motor in a direction consistent with the fluid flow direction in the first and second conduits. The fluid displacement of the pump can be in either direction which changes the flow of fluid in the first and second conduits by creating a difference in pressure between the two conduits. Thus, the motor is caused to rotate in a first and second direction corresponding to forward and reverse directions. The displacement of fluid within the pump is variably controlled by the operator to thereby change the volume of fluid flow within the closed conduit loop between the pump and the motor. Thus, the pump and therefore the output of the motor can variably range from a full reverse position to a neutral position, to a full forward position.

The motor is, in turn, connected through gearing and a differential to the driving axles of the vehicle. Thus, the internal combustion engine imparts rotational motion to the hydrostatic transmission which is translated into variable rotational movement of the axles.

Rotational energy from the internal combustion engine of the vehicle is transferred to the transmission generally via a belt and pulley system. The pulley is connected to an input shaft which extends into the transmission housing. In hydraulic transmissions utilizing radial piston type pumps and motors, the input shaft terminates with an input bevel gear which meshes with a transversely oriented bevel gear connected to the pump cylinder block. The pump cylinder block and the bevel gear are radially disposed about and supported directly on the fluid conduits, known as the pintle, for concentric rotation thereabout. The pump cylinder can be provided with an extending annular hub portion creating a larger bearing surface.

The rotational energy supplied by the internal combustion engine is thus imparted to the pump cylinder block through the input bevel gear of the input shaft and the cylinder bevel gear secured to the pump cylinder block. The input bevel gear, however, produces a load against the cylinder bevel gear, and thus the pump cylinder block, which causes the pump cylinder block and the cylinder bevel gear to depart from concentric rotation relative to and about the pintle. Because of the nonconcentric rotation caused by the imparted load, the pump cylinder block and the cylinder bevel gear can wobble and rock during rotation about the pintle. Such wobbling and rocking creates an undue and uneven wear in both the cylinder block/bevel gear and the outside surface of the pintle thereby resulting in reduced life of the hydrostatic transmission. Additional loading is from the pump cylinder block and pistons which is on the pressure side of the conduit.

It is thus desirable to assure that the bevel gear and associated cylinder block concentrically rotate about the pintle regardless of the magnitude of the loads imparted thereto.

SUMMARY OF THE INVENTION

The present invention overcomes the problems not addressed in the prior art by applying to the cylinder block a hydraulic reaction force which is linearly proportional to the various loads exerted on the rotating cylinder block.

In one form thereof, a hydrostatic transmission includes a conduit disposed in a cavity defined by a housing. A radial piston type hydraulic pump having a cylinder block is rotatably disposed on the conduit. Hydraulic pressure means is disposed adjacent the cylinder block for applying a counterbalancing force to said cylinder block in reaction to loads exerted on the cylinder block during operation of the hydraulic pump. This maintains a cylinder block in essential concentric rotation about the conduit.

In one form thereof, the hydraulic pressure means comprises a recessed area disposed in the conduit adjacent an inner surface of the cylinder block, a passage disposed in the conduit for supplying pressurized hydraulic fluid from the conduit to the recessed area, and an annular groove disposed about the conduit and in fluid communication with the passage and the recessed area for providing the pressurized hydraulic fluid from passage to the recessed area.

The recessed area is oriented such that loads imparted by an input shaft rotating the cylinder block is counteracted thereby.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
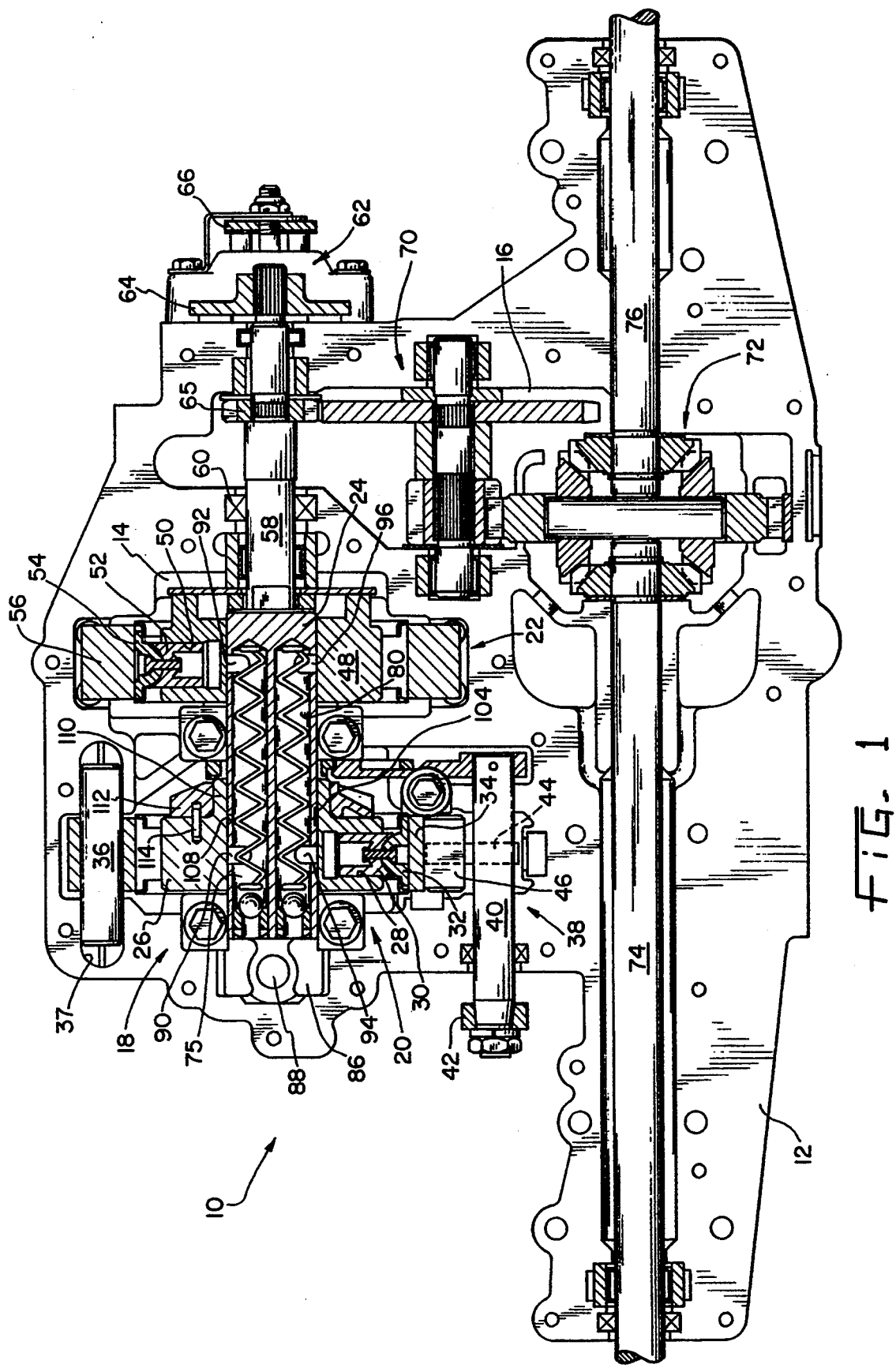
FIG. 1 is a top sectional view of a transaxle having a hydrostatic transmission incorporating the present invention.

Referring to FIG. 1, there is shown a transaxle 10 enclosed in a two part housing of which only the lower housing part 12 is shown. Upper housing part 13 (FIG. 2) and lower housing part 12 of transaxle 10 define a first cavity or chamber 14 and a second cavity or chamber 16. Disposed within first chamber 14 is an infinitely variable hydrostatic transmission 18. Hydrostatic transmission 18 includes a variable displacement radial piston type pump 20 fluidly connected to a fixed displacement radial piston type motor 22 via a pintle or conduit 24. It should be noted that both the pump and the motor may be variable displacement units, or the motor may be a variable displacement unit and the pump a fixed displacement unit. In all cases, the principles of the present invention equally apply. Pump 20, motor 22, and pintle 24 generally constitute the variable displacement hydrostatic transmission portion of the present transaxle 10. Chamber 14 also defines a sump region surrounding the transmission portion in which excess oil accumulates or makeup oil for the transmission is retained.

Pump 14 includes a generally annular cylinder block 26 rotatably disposed on pintle 24 so as to concentrically revolve thereabout. Cylinder block 26 has a plurality of radially extending bores, of which only one bore 28 is shown. Reciprocatingly disposed in each bore 28 is a piston 30 each having a corresponding slipper 32. Radially surrounding cylinder block 26 is a pump track ring 34, the inner circumferential surface of which is contacted by slippers 32. A pivot pin 36 is disposed in a recess 37 formed in lower housing part 12 and the upper housing part (not shown). Pivot pin 36 axially extends through a bore (not shown) formed in one end of pump track ring 34 such that as pump track ring 34 pivots about pivot pin 36 within the confines of chamber 14, pump track ring 34 is eccentrically pivotable about pintle 24 in order to variably change the displacement of pump 20.

The pivoting of pump track ring 34 about pivot pin 36 and pintle 24 is governed by a control mechanism 38. Control mechanism 38 includes a control rod 40 which extends out of the housing and which is rotatable about its longitudinal axis through operator actuated control handle 42. Control handle 42 is fixedly secured to control rod 40 such that movement of control handle 42 in a forward or reverse direction correspondingly rotates control rod 40. A control pin 44 is disposed in control rod 40 transverse to the longitudinal axis thereof and extends into control coupling 46 which is located in pump track ring 34. As control rod 40 is rotated about its longitudinal axis by movement of control handle 42, control pin 44 radially pivots about control rod 40 which pivots pump track ring 34 about pivot pin 36. Thus, through action of control mechanism 38, pump track ring 34 eccentrically pivots about pintle 24, and depending on the direction of rotation, pump 20 is displaced through neutral into a forward or a reverse position.

Motor 22 includes a generally annular cylinder block 48 rotatably disposed on pintle 24. Cylinder block 48 has a plurality of radially extending bore, of which only one bore 50 is shown. Reciprocatingly disposed in each bore 50 is a piston 52 each having a corresponding slipper 54. Radially surrounding motor cylinder block 48 is a motor track ring 56 fixed relative to pintle 24, the inner surface of which is contacted by slippers 54. Motor 22 is fluidly connected to pump 20 via pintle 24 such that fluid pumped into pintle 24 is received by motor 22, while fluid flowing from motor 22 is received by pump 20.

Motor cylinder block 48 is connected to an output shaft 58 such that output shaft 58 rotates therewith. Output shaft 58 extends from chamber 14 into chamber 16, and includes a shaft seal 60 located between chambers 14 and 16. Shaft seal 60 prevents the oil in each chamber 14, 16 from mixing. A brake mechanism 62 is disposed on an axial end of output shaft 58 for retarding and stopping the rotation of output shaft 58 and thus the transmission when so desired by the operator. Brake mechanism 62 is a friction engagement brake where application of a brake pad 64 against output shaft 58 slows shaft rotation. Brake disc 65 is actuated by an operator activated brake actuator lever 66.

Splined onto output shaft 58 is a gear 68 which transmits rotational motion to a gear train 70 connected to a differential 72. Differential 72 transmits the imparted rotational motion to left and right axles 74 and 76 which are each drivingly attached to a wheel of the vehicle, both wheels of which are not shown.

As indicated hereinabove, pintle 24 provides fluid communication between pump 20 and motor 22. Pintle 24 is secured to housing via a pintle pin 77 and pintle clamp (not shown) disposed approximately half-way between pump 20 and motor 22. Pintle 24 includes two fluid conduits or passages 78 and 80 each being closed at one end and having a respective check valve 82 and 84 threadedly disposed in the other end. Check valves 82 and 84 are normally closed valves, here shown as spring-biased ball valves but understood to be any type of suitable valve which retain oil within the respective conduits during operation of transmission 18. Check valves 82 and 84 may be unseated by actuation of an adjacently disposed valve plate 86 via an operator controlled actuator rod 88. When unseated into an open position through actuation of valve plate 86 by actuator rod 88, check valves 82, 84 release the oil under pressure within respective conduits 78, 80. This allows the transmission to bypass normal operation and permits "freewheeling" of the vehicle without resistance.

Figure 2:
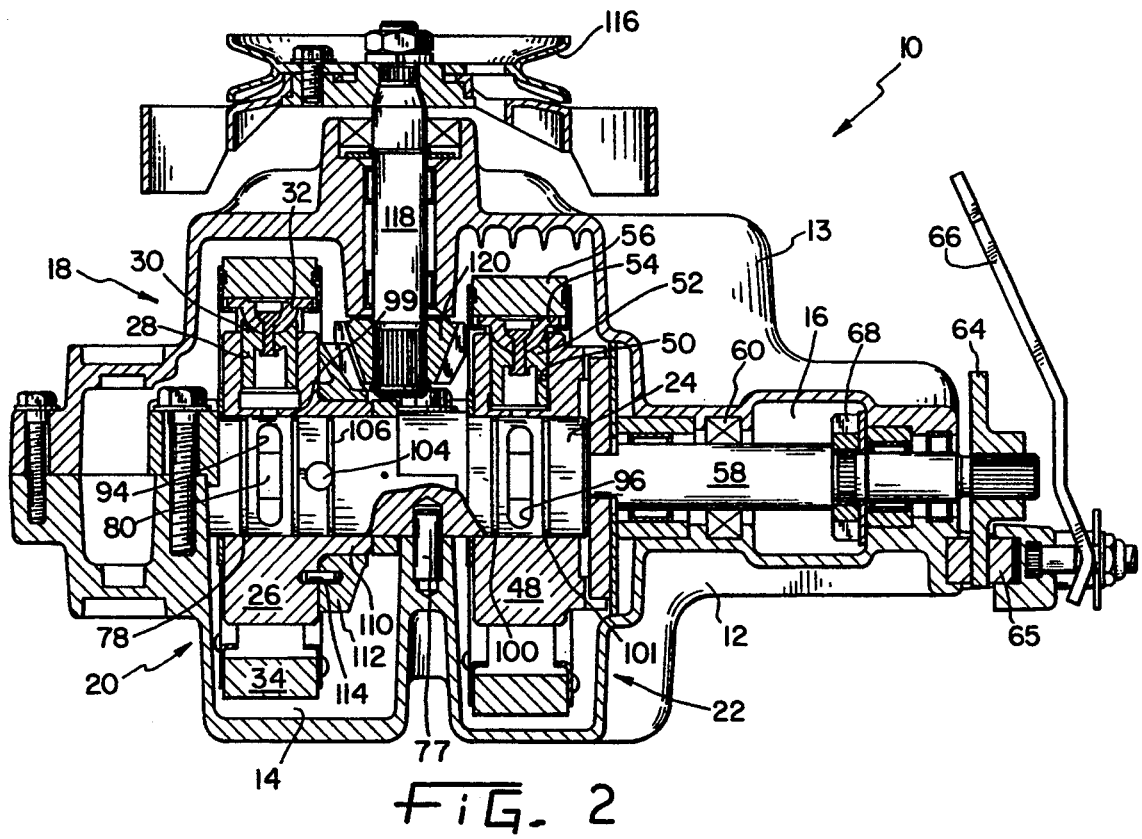
FIG. 2 is a side sectional view of the transaxle of FIG. 1.
Figure 3:
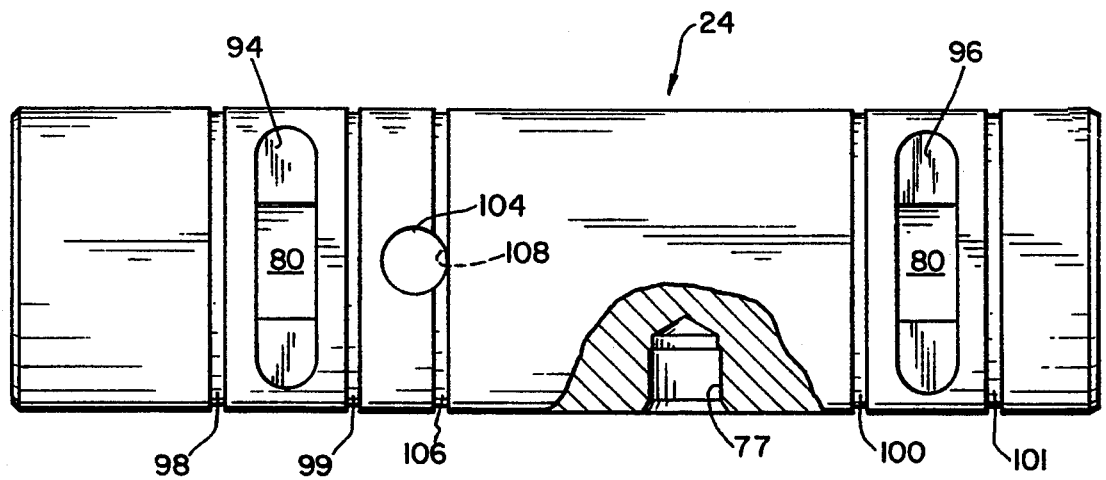
FIG. 3 is an enlarged elevational view of the pintle as depicted in FIG. 2.
Figure 4:
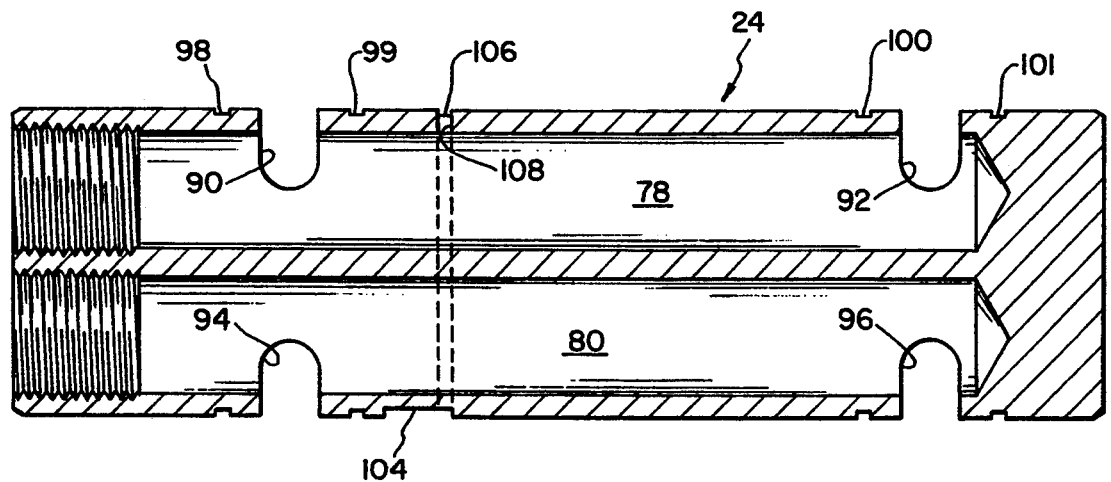
FIG. 4 is an enlarged sectional view of the pintle as depicted in FIG. 1.

Pintle conduit 78 is the high pressure conduit with pintle conduit 80 being the low pressure conduit which is determined by the orientation thereof relative to pump track ring 34. As best seen in FIGS. 2–4, pintle 24 includes two ports 90, 92 located at opposite axial ends thereof providing communication with conduit 78, with port 90 radially inwardly disposed of pump cylinder block 26, and port 92 radially inwardly disposed of motor cylinder block 48. Port 90 provides fluid communication between pump 20 and conduit 78 while port 92 provides fluid communication between motor 22 and conduit 78 such that pump 20 and motor 22 are in fluid communication via high pressure conduit 78 and ports 90, 92. Similarly, pintle 24 includes two ports 94, 96 located at opposite axial ends thereof providing communication with conduit 80, with port 94 radially inwardly disposed of pump cylinder block 26, and port 96 radially inwardly disposed of motor cylinder block 48. Port 94 provides fluid communication between pump 20 and conduit 80 while port 96 provides fluid communication between motor 22 and conduit 80 such that pump 20 and motor 22 are in fluid communication via low pressure conduit 80 and ports 94, 96. Thus, pump 20 and motor 22 are fluidly connected via conduits 78 and 80 forming a closed loop fluid system between the pump and motor.

The outside surface of pintle 24 includes two balancing grooves 98 and 99 with one groove disposed on either axial side of ports 90 and 94 radially inwardly of pump cylinder block 26. Balancing grooves 98 and 99 extend completely about the outside circumference of pintle 24 and are, for example, 0.060 inches wide by 0.020 inches deep, although other widths and depths may be utilized. During operation, oil leakage from high pressure port 90 fills grooves 98 and 99 thereby providing balancing of rotating pump cylinder block 26. Further, grooves 98 and 99 provide a lubricated bearing surface for pump cylinder block 26 which reduces friction between the cylinder block and the pintle as the cylinder block rotates thereabout.

The outside surface of pintle 24 also includes two balancing grooves 100 and 101 with one groove disposed on either axial side of ports 92 and 96 radially inwardly of motor cylinder block 48. Balancing grooves 100 and 101, like balancing grooves 98, 99, extend completely about the outside circumference of pintle 24 and are, for example, 0.060 inches wide by 0.020 inches deep, although other widths and depths may be utilized. During operation, oil leakage from high pressure port 96 fills grooves 100 and 101 thereby providing balancing of rotating motor cylinder block 48. Further, grooves 100 and 101 provide a lubricated bearing surface for motor cylinder block 48 which reduces friction between the cylinder block and the pintle as the cylinder block rotates thereabout.

According to an aspect of the present invention, pintle 24 includes a recessed area or notch disposed in the outer surface thereof constituting a pressure pad 104. Pressure pad 104 is, for example, a 5/16 inch diameter, circular indentation of between 0.028 and 0.038 inches in depth. An annular groove 106 is disposed in the outer surface of pintle 24 such that a portion of pressure pad 104 is in communication therewith. Groove 106 is, four example, 0.060 inches in width and 0.020 inches in depth and extends completely about the outside circumference thereof. Disposed 180° from pressure pad 104 on pintle 24 and located in groove 106 is a passage 108 which extends into high pressure conduit 78. Passage 108 thus allows oil from high pressure conduit 78 to fill groove 106 and thus pressure pad 104. As explained in more detail hereinbelow in connection with the operation of the present transmission, pressure pad 104, groove 106, and passage 108 form a hydraulic piston which counteracts various loads imparted to pump cylinder block 26 by input bevel gear 120. Pressure pad 104, being filled with oil from high pressure conduit 78 via passage 108 and groove 106, exerts a force against pump cylinder block 26 proportional to the force exerted by the various loads. Pressure pad 104 is preferably oriented 90° relative to input shaft 118 due to the various loading factors. Although such orientation may change due to the loading factors, pressure pad 104 would be disposed under pump cylinder block 26 and extending hub portion 110.

Figure 5:
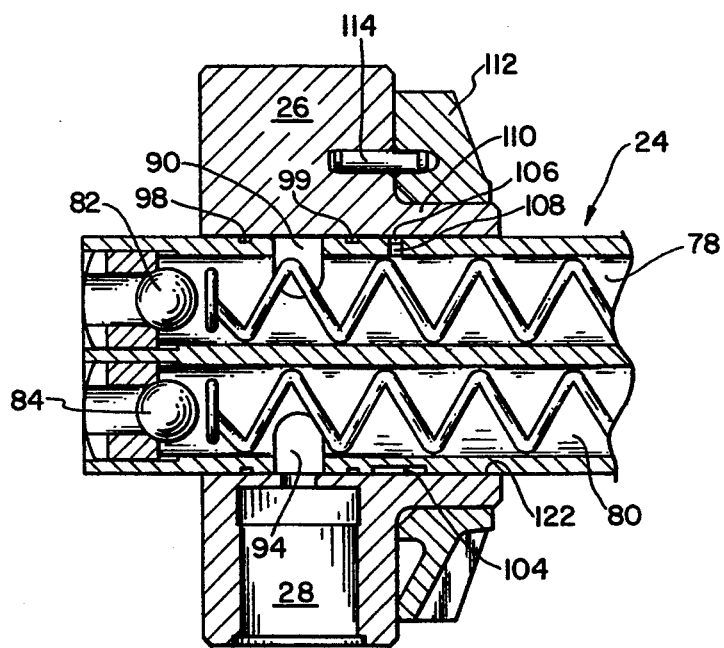
FIG. 5 is an enlarged fragmentary sectional view of the pump cylinder and pintle as depicted in FIG. 1.

As best shown in FIG. 5, pressure pad 104 is disposed in pintle 24 radially inwardly of pump cylinder block 26 such that pressure pad 104 is between pump cylinder block 26 proper, and an extended hub portion 110 of pump cylinder block 26. Hub portion 110 axially extends from pump cylinder block 26 and radially surrounds pintle 24. Hub portion 110 effectively provides a larger bearing surface for pump cylinder block 26 as it rotates about pintle 24. It should be noted that pressure pad 104 may be located anywhere along pintle 24 as long as it remains underneath pump cylinder block 26 and associated hub portion 110. However, such location as shown and described is preferable.

With particular reference to FIG. 2, rotational energy for transaxle 10 may be provided by an internal combustion engine (not shown) which is connected to an input shaft 118 of transaxle 10 via a belt (not shown) and pulley 116 secured to input shaft 118. Input shaft 118 extends into upper housing part 13 and terminates in an input bevel gear 120. Input bevel gear 120 meshes with a bevel gear 112 which is supported on hub portion 110 and attached to cylinder block 26 via spirol pin 114. Thus, rotational energy imparted to bevel gear 112 via input bevel gear 120 rotates pump cylinder block 26 about pintle 24. Rotation of pump cylinder block 26 rotates pump pistons 30 within pump cylinder block bores 28. Pump piston slippers 32 which contact the inner periphery of pump track ring 34 are guided by pump track ring 34 such that the position of pump track ring 34 about pintle 24 determines the amount of fluid pressure developed by pump pistons 30 and the rotational direction of travel of motor cylinder block 48. The rotational direction of travel of motor cylinder block 32 and its relative speed determined by the fluid pressure in the respective conduits 78, 80, determines the output drive speed of the vehicle.

The rotational motion of input shaft 118 is transmitted to bevel gear 112 via input bevel gear 120 at the point where the gears meet. The ratio of input bevel gear 120 to bevel gear 112 being 2.3 to 1. A load is created by input bevel gear 120 causing a force against bevel gear 112 at the meshing point. This tends to make bevel gear 112 and pump cylinder block 26 tilt relative pintle 24 thereby causing nonconcentric rotation thereof about pintle 24. Such nonconcentric rotation is counteracted by hydraulic pressure developed by pressure pad 104 which develops a force which is exerted against the inner surface 122 of pump cylinder block 26. Thus, pressure pad 104 lifts pump cylinder block 26 from pintle 24 as it rotates thereabout by the column of pressurized oil fed from passage 108 in groove 106 such that pump cylinder block 26 concentrically rotates about pintle 24. It should be understood that such oil also provides lubrication between the inner surface of pump cylinder block 26 and hub portion 110, and the outside surface of pintle 24.

Increased loading by input bevel gear 120 against bevel gear 112 can occur as a result of the output torque required or exerted on the transaxle. The required output torque translates into increased torque upon input shaft 118 and input bevel gear 120. However, the output torque also increases the oil pressure within high pressure conduit 78 thus increasing the oil pressure being fed to pressure pad 104. This in turn increases the reaction force applied by pressure pad 104 against pump cylinder block 26 to counteract the increased input bevel gear 120 loading. Further, as the force of pump cylinder block 26 increases on pressure pad 104, the pressure on the oil within pressure pad 104 increases to provide an additional counterbalancing force against the cylinder block. This also increases the lubricating effect between the pintle and the cylinder block.

The size of pressure pad 104 is determined based upon the anticipated loads which will be exerted upon the transmission. This, in turn, is dependent upon the application of the transmission. The size of pressure pad 104 should not create an over-reaction force such that opposite tilting of the cylinder block will occur. For typical applications, such as lawn and garden tractors and the like, the dimensions detailed hereinabove are sufficient.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of driving and of counteracting tilting loads exerted against a cylinder block in a hydrostatic transmission having a radial piston type hydraulic pump having a cylinder block rotatably disposed on a conduit and in fluid communication therewith via a conduit port, the method comprising the steps of:

driving the cylinder block on the conduit by means of an input bevel gear;

providing a recessed area in the outer surface of the conduit, said recessed area disposed adjacent to the cylinder block; and supplying pressurized hydraulic fluid from an interior of the conduit to the recessed area, the hydraulic fluid and the recessed area together forming a hydraulic piston to counteract tilting loads exerted against the cylinder block by the bevel gear such that the cylinder block concentrically rotates about the conduit during operation.

2. The method of claim 1, wherein the recessed area is 5/16 inches in diameter and between 0.028 and 0.038 inches in depth.

3. The method of claim 1, further comprising the step of:

providing an annular groove on the outer surface of the conduit, the annular groove intersecting the recessed area and the passage for providing fluid communication between the passage and the recessed area.

4. The method of claim 3, wherein the pressurized hydraulic fluid is exerted against the cylinder block at an angular position about the axis of rotation of the cylinder block displaced about 90° from the point of bevel gear engagement of the cylinder block.

5. A hydrostatic transmission comprising:
   a housing defining a cavity;
   a conduit disposed in said cavity;
   a variable displacement radial piston type hydraulic pump rotatably disposed on said conduit, said hydraulic pump including a cylinder block radially disposed on said conduit and in fluid communication therewith;
   a bevel gear being one of integral with and attached to said cylinder block;
   an input shaft having an input bevel gear, said input bevel gear enmeshing with and rotatably driving said bevel gear; and
   hydrostatic pressure means disposed adjacent said cylinder block for applying a counterbalancing force to said cylinder block in reaction to loads exerted on said cylinder block by said input bevel gear during operation of said hydraulic pump, such that said cylinder block concentrically rotates about said conduit, said hydrostatic pressure means disposed in constant fluid communication with an interior of said conduit.

6. The hydrostatic transmission of claim 5, further comprising:
   an input shaft extending through said housing and into said cavity for transmitting rotational motion to said hydraulic pump; and
   a bevel gear disposed on an end of said input shaft within said cavity and imparting rotational motion from said input shaft to said cylinder block through mutual engagement therewith, said gear exerting a load against said cylinder block such as to cause said cylinder block to nonconcentrically rotate about said conduit;
   said hydraulic pressure means oriented on said conduit such that said gear load is counteracted thereby.

7. The hydrostatic transmission of claim 6, wherein said hydraulic pressure means is oriented on said conduit 90° from the point where the bevel gear engages said cylinder block.

8. The hydrostatic transmission of claim 5, wherein said hydraulic pressure means comprises:
   a recessed area disposed in said conduit adjacent an inner surface of said cylinder block; and
   a passage disposed in said conduit for supplying pressurized hydraulic fluid from a high pressure passageway in said conduit to said recessed area.

9. The hydrostatic transmission of claim 8, wherein said recessed area is a 5/16 inch diameter circular indentation, and said passage is a 1/16 inch diameter bore.

10. The hydrostatic transmission of claim 8, wherein said hydraulic pressure means further comprises:
    an annular groove disposed about said conduit and in fluid communication with said passage and said recessed area for providing the pressurized hydraulic fluid from said passage to said recessed area.

11. The hydrostatic transmission of claim 6, wherein said cylinder block includes a second bevel gear in engagement with said first mentioned bevel gear.

12. The hydrostatic transmission of claim 11, wherein said hydraulic pressure means is disposed about said conduit 90° from the engagement of said bevel gears.

13. A hydrostatic transmission comprising:
    a housing defining a cavity;
    a conduit disposed in said cavity;
    a variable displacement radial piston type hydraulic pump rotatably disposed on said conduit, said hydraulic pump including a cylinder block radially disposed on said conduit and in fluid communication therewith;
    a bevel gear being one of integral with and attached to said cylinder block;
    an input shaft having an input bevel gear, said input bevel gear enmeshing with and rotatably driving said bevel gear; and
    a hydrostatic piston formed in said conduit adjacent an inner surface of said cylinder block exerting pressurized hydraulic fluid against said cylinder block for applying a counterbalancing reaction force to said cylinder block linearly proportional to loads exerted on said cylinder block by said input bevel gear during operation of said hydraulic pump, such that said cylinder block is caused to concentrically rotate about said conduit, said hydrostatic piston disposed in constant fluid communication with an interior of said conduit.

14. The hydrostatic transmission of claim 13, wherein said hydraulic piston comprises:
    a circular indentation located in an outer surface of said conduit;
    an annular groove disposed in the outer surface of said conduit, said annular groove intersecting said recess; and a passage in said conduit disposed within said annular groove, said passage supplying pressurized hydraulic fluid from said conduit to said recess via said annular groove.

15. The hydrostatic transmission of claim 14, wherein said passage is disposed 180° from said circular indentation about said conduit, and said annular groove circumferentially extends completely about said conduit.

16. The hydrostatic transmission of claim 14 further comprising:

an input shaft extending through said housing and into said cavity for transmitting rotational motion to said hydraulic pump; and a gear disposed on an end of said input shaft within said cavity and imparting rotational motion from said input shaft to said cylinder block through mutual meshing engagement therewith, said gear exerting a load against said cylinder block;

said hydraulic piston located 90° from said input shaft relative said conduit.

17. A hydrostatic transmission comprising:

a housing defining a cavity therein;

a conduit disposed in said cavity;

a variable displacement radial piston type hydraulic pump rotatably disposed on said conduit, said hydraulic pump including a cylinder block radially disposed on said conduit and in fluid communication therewith, said cylinder block including a first bevel gear fixed thereto;

an input shaft extending through said housing and into said cavity for transmitting rotational motion to said hydraulic pump;

a second bevel gear disposed on said input shaft within said cavity, said second bevel gear meshed with said first bevel gear to impart rotational motion from said input shaft to said cylinder block, said gear exerting a tilting load against said cylinder block; and a hydrostatic piston utilizing pressurized hydraulic fluid from said conduit and disposed in constant fluid communication with an interior of said conduit, said hydrostatic piston orientated accordingly for applying a counterbalancing force against an inner surface of said cylinder block in reaction to the tilting load imparted to said cylinder block by said input bevel gear, said hydrostatic piston comprising a recess in an outer surface of said conduit disposed radially under an inner surface of said cylinder block.

18. The hydrostatic transmission of claim 17, wherein said recess is disposed about 90° from the point where said gears mesh.

* * * * *